United States Patent [19]
Eisenberger et al.

[11] 3,917,944
[45] Nov. 4, 1975

[54] RADIATION SENSITIVE FLASH APPARATUS

[75] Inventors: Gary Eisenberger, Los Angeles; Steven Z. Muzslay, Van Nuys, both of Calif.

[73] Assignee: Optigon Research & Development Corporation, Santa Monica, Calif.

[22] Filed: Feb. 11, 1974

[21] Appl. No.: 441,410

[52] U.S. Cl. ............ 250/239; 210/214 P; 240/1.3; 315/241 P; 339/8 R; 354/33
[51] Int. Cl.² ............................................ H01J 5/02
[58] Field of Search ...... 354/33, 131; 240/1.3, 52.1; 250/239, 214 P; 339/6 R, 8 R, 5 R; 315/241 P, 241 S, 156

[56] References Cited
UNITED STATES PATENTS

| | | | |
|---|---|---|---|
| 2,757,317 | 7/1956 | Harlan | 315/156 |
| 2,776,364 | 1/1957 | Daniels | 250/214 P X |
| 3,031,582 | 4/1962 | Benner et al. | 250/239 |
| 3,056,035 | 9/1962 | Bernheim | 250/239 |
| 3,312,086 | 4/1967 | Casebeer et al. | 354/131 X |
| 3,437,976 | 4/1969 | Nelson | 339/8 R |
| 3,710,130 | 1/1973 | Pate | 250/239 |

*Primary Examiner*—Walter Stolewin
*Attorney, Agent, or Firm*—Lyon & Lyon

[57] ABSTRACT

A photographic accessory such as a slave device having a light sensor and a rotatable hot shoe for use with mating equipment such as an electronic slave flash unit is disclosed herein. The rotatable hot shoe allows the electronic slave flash unit to be aimed in a desired direction and the light sensor of the slave device to be positioned to receive light from a different direction without sync cable connections between the electronic slave flash unit and the slave device.

20 Claims, 3 Drawing Figures

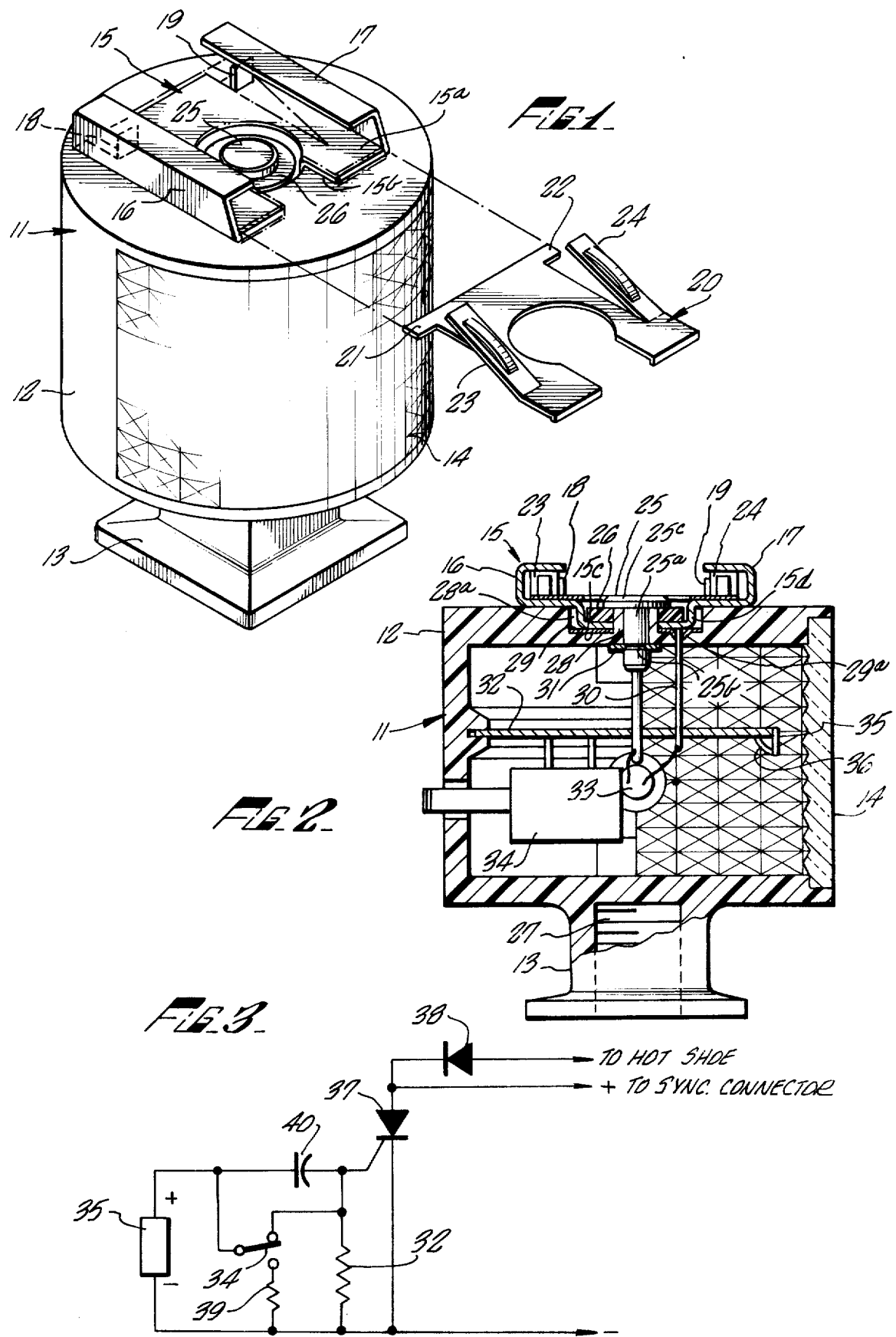

3,917,944

RADIATION SENSITIVE FLASH APPARATUS

BACKGROUND OF THE INVENTION

This invention relates to photographic apparatus such as flash units, cameras and other devices where a rotatable hot shoe may be used.

More particularly, an embodiment of this invention relates to a device such as a slave device which includes a light sensor and an externally mounted rotatable bracket or hot shoe. The hot shoe provides both mechanical and electrical connections to an associated flash unit such as an electronic slave flash unit having a mating hot shoe.

Various types of automatic electronic flash units use a light sensor to sense the light reflected from an object being photographed in order to terminate the flash of light from the flash unit at the proper time to achieve a proper exposure. In addition, there are slave or remote flash units which include a light sensor which responds to the flash (as distinguished from the reflected light) from a main source such as a flash cube to trigger a flash of light, i.e. turn on the flash. The latter is used, for example, where it is desired to use two or more flash units, with the second, and each succeeding flash unit being responsive in operation, i.e. to emit a flash, to the flash of light from the first or main flash unit.

Major applications of slave units in photography have been to avoid the effects of "flatness" resulting from having the light source and the camera in the same plane, and to achieve special lighting effects desired by photographers and not obtainable from a single flash unit. Thus, photographic flash apparatus capable of activation upon a predetermined amount of light has proven to be desirable in the photographic field.

Further, electronic flash units are available which include a "hot shoe". This is a mechanical and electrical bracket by which the flash unit can be attached to a camera to enable the camera both to mechanically support the flash unit as well as to provide an electrical switching signal to the flash unit to operate the same as the camera shutter is opened. Many cameras have a mating shoe or connector to receive the hot shoe of the flash units.

In the past, attempts to achieve flash units which allow the slave flash unit to be positioned in a desired direction, such as at the subject, and the light sensor to be positioned to receive light from a main flash have required the use of a pc or sync cord. Other prior art techniques required bulky modification of the slave flash unit and the slave flash units to be either permanently mounted to associated light sensing equipment or connected thereto through universal or ball and socket joint connections. These connections typically required the passing of wires therethrough and were a source of electrical and mechanical failure.

Briefly stated, and according to one aspect of this invention, a slave device is provided which is coupled to an associated electronic slave flash unit through a rotatable hot shoe. The rotatable hot shoe allows the positioning of the slave flash unit in a desired direction, such as for bounce flash, while maintaining electrical and mechanical connections with the slave device. Further, the slave device includes a light sensor, such as a photoelectric cell positioned within the housing thereof, which can be positioned to receive light from a main flash unit while the slave flash unit is aimed in a different direction, all without the use of a PC or sync cord between the slave and the slave flash unit.

SUMMARY OF THE INVENTION

It is an object of this invention to provide a slave device, including a light sensor, for activating associated electronic slave flash equipment through a rotatable hot shoe.

It is also an object of this invention to provide a slave device, with a rotatable hot shoe, which allows the positioning of an associated electronic slave flash unit in a desired direction.

It is a further object of this invention to provide a slave device which is capable of being mounted on a camera or tripod and includes light sensing means capable of activating an associated electronic slave flash unit through a rotatable hot shoe mounted thereon, all without the use of sync cable connections or the like.

It is another object of this invention to provide a slave device coupled with a slave flash unit through a rotatable hot shoe thereby allowing one to aim the slave flash unit as desired while the slave device itself can be aimed toward the main flash source for more efficient sensing.

BRIEF DESCRIPTION OF THE DRAWINGS

The invention both as to its organization and principles of operation, together with further objects and advantages thereof, may better be understood by referring to the following detailed description of an embodiment of the invention taken in conjunction with the accompanying drawing in which:

FIG. 1 is a perspective view of a slave device with a rotatable hot shoe and a spring member in accordance with this invention.

FIG. 2 is a side view, partially in cross-section, of the slave device of FIG. 1 in accordance with this invention.

FIG. 3 is a schematic diagram of an embodiment of switching circuitry for the slave device of FIG. 1 in accordance with this invention.

DETAILED DESCRIPTION

Referring now to FIG. 1, a slave device indicated generally by the numeral 11 includes a casing 12, generally cylindrical in shape and having a diameter, for example, of approximately 1 inch. The shape of the slave device 11 is chosen for its compactness and attractiveness and, as such, may be formed other than cylindrical in shape.

The casing 12 is formed from a material such as black Lexan or other material chosen for its strength, attractiveness, and opaqueness. The casing 12 may include a mounting member such as stem member 13, either formed integrally with the casing 12 or separately connected thereto.

In the embodiment of FIG. 1, approximately one half of the casing 12 is open, and a translucent or transparent cover or lens 14 is attached thereto, thereby forming a housing for internal components to be detailed later. The lens 14 may be connected or mated to the casing 12 by a variety of conventional techniques, such as a frictional detent tab arrangement. These tabs may be either formed integrally with or separate from the lens 14. Typically, if detent tabs are used, four such tabs are provided at mating corners of the lens 14. The lens 14 may be formed of a material such as a clear Lexan.

In FIG. 1, the lens 14 is provided with an optional grid design on the interior face thereof, such as a diamond pattern, to better disperse light passing therethrough. This effect aids in dispersing the light impinging upon a light sensor, internal to the slave device 11. Further, this effect substantially prevents one from seeing the internal components of the slave device 11 from the outside thereby adding to the overall appearance of the slave device 11. As will be apparent to those skilled in the art, the translucent cover 14 may be of any size and shape which allows light passing therethrough to impinge upon the light sensor included in the slave device 11.

Mounted on the top portion of the slave device 11 is a generally rectangular bracket or hot shoe means generally designated by the numeral 15. The hot shoe 15 is rotatable with respect to a center axis of the casing 12. The hot shoe 15 is formed from a single electrically conductive piece of material, such as chrome plated brass, and includes guide members 16 and 17 formed on opposite edges of the hot shoe 15. Each guide member is formed by twice bending the material at opposite edges of hot shoe 15 approximately 90° thereby forming a side and upper portion for each guide member. The guide members 16 and 17 facilitate mating of associated electronic equipment, such as an electronic slave flash unit, with the hot shoe 15. Other types of guide means, to facilitate the coupling of equipment to the slave device 11, may readily be used either apart from or in combination with guide members 16 and 17 shown in FIG. 1.

Stop means, such as stop members 18 and 19, are integrally formed toward the back of the hot shoe 15 by cutting a portion of the base of hot shoe 15 and bending the formed inserts or tabs to provide a stop for mating electronic equipment. Although stop members 18 and 19 are shown as being formed at one end of the hot shoe 15, and substantially under the upper portion of the guide members 16 and 17 respectively, other forms or numbers of stop members may readily be used. For example, a single stop member may be positioned between guide members 16 and 17 or, along the entire back edge of the hot shoe 15.

In FIG. 1, a single flat stock friction fit resilient spring member indicated generally by the numeral 20 is positioned on the base of the hot shoe 15. Tabs 21 and 22 cooperate with stop members 18 and 19 to aid in positioning the spring member 21 in the hot shoe 15. Spring arms 23 and 24 are formed at opposite sides of the spring member 20 and frictionally hold the spring member 20 in the hot shoe 15 and provide a frictional force fit to mating hot shoe assemblies of slave flash units. Spring arms 23 and 24 may be formed in a variety of ways, such as with projecting cutouts, to aid in providing a releasable friction force fit to the mating hot shoe assembly. The spring member 20 may be positioned on, or attached to, the base of the hot shoe 15 by passing it over the stops 18 and 19 from either the front or the back of the hot shoe 15.

Other methods of providing the proper frictional force between the hot shoe 15 and an associated slave unit or the like may also be utilized. For example, some slave flash units include adjustable telescoping bases which provide such a frictional fit with the hot shoe of the slave device.

The forward portion 15a of the base of the hot shoe 15 is formed with a slot 15b to accommodate certain slave flash units having an exposed center contact. This type of contact may cause a discharge of its associated slave flash unit if it is slid over a conductive material such as the base of the hot shoe 15, during mating.

Referring now to FIG. 2, the slot 15b, formed at the forward portion of the base 15a, extends to a portion of the periphery of a generally circular depressed center portion 15c of the base of the hot shoe 15. The depressed center portion 15c includes a centrally located aperture. Surrounding the remainder of the periphery of the center portion 15c is a shoulder portion 15d integrally formed therewith and extending to the base of the hot shoe 15.

The top of the casing 12 is provided with a generally circular groove or depression 28a disposed about a shoulder member 28 which defines a passageway through the top of the casing 12. Disposed about the shoulder member 28 and beneath the center portion of the hot shoe 15 is a contact washer 29. The contact washer 29 may be formed from a material such as nickel-silver-770, or other electrically conductive material. The contact washer 29 is electrically connected to a conductive wire or pin 30. The pin 30 is preferably electrically connected to the contact washer 29 by means of a solder joint in such a manner that the upper surface of the contact washer 29 will remain relatively flat. This is readily accomplished by providing the contact washer 29 with a downwardly projecting walled aperture 29a and soldering an end of the pin 30 to the walled portion of the aperture.

Positioned above the contact washer 29 and in electrical contact therewith is the center portion 15c of the hot shoe 15. The contact washer 29 may be provided with a plurality of outwardly extending dimples or protrusions on either of its surfaces to positively provide electrical contact with the center portion 15c of the hot shoe 15. The hot shoe 15 is positioned on the contact washer 29 by aligning its centrally located aperture over the shoulder member 28 on the tip of the casing 12.

Disposed above the center portion 15c of the hot shoe 15 and about the shoulder member 28 is an insulating washer 26 which may be formed of a material such as plastic or other electrically insulating material. The insulating washer 26 serves the function of insulating the center conductor contact 25 from the rotatable hot shoe 15. Disposed above the insulating washer 26 is a head portion 25c of the center conductor 25.

The center conductor 25 is formed of an electrically conductive material, such as nickel plated brass, and the top surface of its head portion 25c may be appropriately shaped to provide suitable electrical contact with the appropriate terminal on associated flash apparatus. A body portion 25a of the center conductor 25 is also disposed within the aperture formed by the shoulder portion 28 of the top of the casing 12 of the slave device 11. The body portion 25a of the center conductor 25, at the bottom side of the top of the casing 12 is provided with a groove 25b adapted to receive a retaining ring 31. As an alternative to the retaining ring 31, a washer may be used which is securely held to the bottom of the top of the casing 12 by any means such as deforming a portion of the conductor 25.

A printed circuit board 32 is mounted within the casing 12 by means well known in the art, such as a friction grip arrangement molded in a wall of the casing 12. The printed circuit board 32 contains circuitry, as will be described when referring to FIG. 3. The center conductor 25 and the pin 30 are both electrically connected through means such as solder or connector joints to appropriate circuitry in the printed circuit board 32. The lower extended body portion 25a of the center conductor 25 may be formed integral with or separate from, the head portion 25c of the center conductor, the requirement being that electrical conduction is maintained therebetween. Likewise, pin 30 is electrically connected to the contact washer 29 and passed through an aperture in the top of the casing 12 to the printed circuit board 32.

The lower portion of the center conductor 25 and the pin 30 may pass through the printed circuit board in order to facilitate electrical connection with a female connector member 33 to allow the passage of an associated male member of a pc cord from a flash unit which is not equipped with a mating hot shoe. The male member of the pc cord is electrically connected to both the center conductor 25 and the pin 30 in a manner well known in the art. The female member 33 is, of course, optional in the slave device 11 and, if included, provides further flexibility in use of the slave device 11.

Also, coupled electrically and mechanically to the underside of the printed circuit board 32, is switch unit 34 having a push button or toggle portion extending through an aperture in a side of the casing 12 to allow the circuitry to be suitable to either a high or low sensitivity.

Disposed at one end of the printed circuit board 32 and aligned so that it would be activated by radiation, such as light passing through the lens 14, is a light sensor, such as photocell 35. The photocell 35 is mounted in the proper orientation on the printed circuit board 32 through relatively rigid lead wires 36, and is appropriately connected to circuitry on the printed circuit board 32 by these same lead wires 36. Other means for mounting the photocell 35 in the slave device 11 will be readily apparent to those skilled in the art.

When the photocell 35 receives a predetermined amount of light (as from a main flash unit) a signal is provided to the hot shoe 15 to operate an auxiliary flash unit coupled therewith. Of particular significance is the fact that the hot shoe 15 can rotate (while still maintaining proper electrical contact). This feature allows the auxiliary or slave flash unit attached to the hot shoe 15 to be rotated and aimed at the object being photographed or elsewhere for bounce or fill-in flash, which the slave device (the body with the photocell sensor) itself can be aimed toward the main flash unit to enable more efficient sensing. All electrical contact to the auxiliary flash unit is maintained through the rotating hot shoe, thereby eliminating the need for using a separate cable connector (pc cord) between the auxiliary flash unit and the slave device.

Referring now to FIG. 3, there is illustrated an embodiment of switching circuitry which may be set for either high or low sensitivity by a switch, such as switch 34. The photocell 35 may be a silicon solar cell or other type light sensor. When the switch 34 is in a first or high position, the cell 35 is DC coupled to the gate of a silicon controlled rectifier (SCR) 37. The SCR 37 is connected at its anode either to a sync or pc connector (when the slave flash unit does not include a mating hot shoe) or through a disconnect diode 38 to the hot shoe (in the event that a slave unit includes the appropriate mating shoe). The purpose of the disconnect diode is to eliminate a shock hazard when the pc connector is used. When the photocell 35 is DC coupled to the gate of the SCR 37, it is also connected across a shunt resistor 32 which may have a value such as 39,000 ohms.

When the switch 34 is in its second, or low position, AC coupling occurs and the positive side of the photocell 35 is electrically connected in parallel with a resistor 39. This resistor may have a value such as 1,000 ohms. The positive terminal of the photocell 35 is further connected to a capacitor 40 with a value such as 0.47 microfarad, which in turn is connected to the gate of the SCR 37 to provide the AC coupling.

Thus, circuitry is provided which has two levels of sensitivity, i.e. when DC coupled, or in the first position of the switch, a less amount of light will cause a signal to be presented to the auxiliary flash device than when the photocell is AC coupled. In the high position, the photocell is DC coupled to the gate of an SCR, and the SCR is connected to the hot shoe. In the low position, the photocell is AC coupled to the gate of the SCR and a low resistance shunt is connected across the cell. The circuitry disclosed herein is only exemplary of the many types of switching circuitry which may accomplish the proper activation of the flash of an auxiliary slave flash unit.

As shown in FIG. 2, the stem 13 of the slave device 11 includes attaching means such as internal threads 27 which allow the slave device 11 to be attached or mounted to a tripod, camera show or the like.

In use, the hot shoe of the auxiliary, or slave, flash unit is coupled with the hot shoe of the slave device and the head portion 25c of the center conductor 25 and the hot shoe 15 make two respective electrical contacts with corresponding contacts on the hot shoe of the auxiliary flash unit. When the photocell receives light (from the main flash unit) the auxiliary flash unit is caused to fire and thereby emit light.

While an embodiment and application has been shown and described, it will be apparent to those skilled in the art that many more modifications are possible without departing from the inventive concepts herein described.

What is claimed as new and desired to be secured by Letters Patent of the U.S. is:

1. A flash triggering device for use with an electronic flash unit of the type having a hot shoe comprising a mounting shoe for physically mounting said flash unit and electrical terminal means on said mounting shoe for triggering said flash unit to produce a flash, the improvement comprising
body means forming a housing for said triggering device, said body means having a top and said body means having at least a side portion thereof transparent to light,
said body means including light sensing means for receiving light passing through said transparent portion of said body means, said light sensing means being responsive to received light for providing an electrical signal in response to the receipt of a predetermined amount of light,
hot shoe means on said top of said body means mounted for rotation about an axis substantially normal to said top of said body means and for releasably receiving and mounting the hot shoe of an electronic flash unit, said hot shoe means comprising flange means for mechanically mating with the mounting shoe of an electronic flash unit for physically coupling an electronic flash unit with said slave device and for providing a first electrical connection between an electrical terminal of the hot shoe of the electronic flash unit and said light sensing means, said flange means being coupled with said body means for rotation with respect thereto about said axis, a portion of said flange means forming an electrical conductor providing a slidable rotary electrical contact with an electrical conductor connected to said light sensing means, and said hot shoe means including an electrical contact mounted on said top of said body means substantially coaxially with said axis of rotation of said hot shoe means, said electrical contact having a first portion for providing a second electrical connection between a second electrical terminal of the hot shoe of the electronic flash unit, and having a second portion electrically connected to said light sensing means.

2. The device of claim 1 wherein
said body means comprises a housing having a translucent portion forming said light transparent portion thereof, and
said light sensing means includes a light sensor responsive to light passing through said translucent portion and includes an electrical circuit connected with said light sensor, said flange and electrical contact of said hot shoe means being connected with said electrical circuit.

3. The device of claim 2 wherein
said electrical circuit includes a switch member having first and second positions for respectively providing high and low sensitivity settings for said circuit with respect to light received by said light sensor.

4. The device of claim 3 wherein
said circuit includes a silicon controlled rectifier, said light sensitive means being DC coupled to said silicon controlled rectifier in said high sensitivity setting of said switch member, and said light sensor being AC coupled to said silicon controlled rectifier in said low sensitivity setting thereof.

5. The device of claim 2 wherein
said translucent portion is a lens having a diamond pattern on at least one face.

6. The device of claim 5 wherein
said housing and said lens form a generally cylindrical exterior surface for said body means.

7. The device of claim 1 wherein
said flange of said hot shoe means includes first and second spaced channel-shaped guide means, and
spring means are frictionally coupled with said guide means for providing the frictional force fit with a hot shoe of the flash unit.

8. The device of claim 1 wherein
said body means comprises a housing having a translucent portion forming said light transparent portion thereof, said light sensing means includes a light sensor responsive to light passing through said translucent portion and includes an electrical circuit connected with said light sensor, said flange and electrical contact of said hot shoe means being connected with said electrical circuit, and
said electrical circuit being on board means secured within said housing, and said light sensor being disposed on an edge of said board means and having a light sensitive surface facing said translucent portion of said body means.

9. A flash triggering device, for use with an electronic flash unit of the type having a hot shoe comprising a mounting shoe for physically mounting said flash unit and electrical terminal means on said mounting shoe for triggering said flash unit to produce a flash, the improvement comprising
body means forming a housing for said triggering device, said body means having a portion thereof transparent to light, and said body means having a surface with a shoulder extending therefrom, said shoulder having an opening therethrough,
said body means including light sensing means for receiving light passing through said transparent portion of said body means and providing an electrical signal in response thereto,
bracket means on said surface of said body means mounted for rotation about an axis substantially normal to said surface of said body means and for releasably receiving and mounting the hot shoe of the electronic flash unit, said bracket means including first and second spaced guide means having side and upper portions for slidably receiving a cooperating mating shoe of a flash unit and providing a first electrical contact for the shoe of the flash unit, said bracket means including a central section extending from said guide means and terminating in a center portion having upper and lower surfaces, said center portion having an opening therein, and said center portion being mounted on said surface of said body means with said opening of said center portion mounted substantially coaxially with respect to said shoulder of said body means,
contact means mounted on said body means and engaging a surface of said center portion of said bracket means for providing a slidable rotary electrical contact with said center portion irrespective of the degrees of rotation of said bracket means with respect to said body means,
electrically nonconductive means between said upper surface of said center portion of said bracket means and said shoulder of said body means for maintaining said center portion of said bracket means on said body means, and
central conductor means extending through said opening in the shoulder of said body means and terminating in an electrical contact at the top of said shoulder of said body means and forming a second electrical contact for the shoe of the flash unit.

10. The device of claim 9 wherein
said body means comprises a housing having a translucent portion forming said light transparent portion thereof,
said light sensing means includes a light sensor responsive to light passing through said translucent portion and includes an electrical circuit connected with said light sensor, said bracket and electrical contact being connected with said electrical circuit,
said electrical circuit includes a switch member having first and second positions for respectively providing high and low sensitivity settings for said circuit with respect to light received by said light sensor, and
said circuit includes a silicon controlled rectifier, said light sensitive means being DC coupled to said silicon controlled rectifier in said high sensitivity setting of said switch member, and said light sensor being AC coupled to said silicon controlled rectifier in said low sensitivity setting thereof.

11. The device of claim 9 wherein
said guide means of said hot shoe means includes a substantially flat bottom section terminating in a pair of spaced and substantially parallel channel guides, said guide means includes a stop formed by a tab at one end of said flat portion, and the other end of said flat section includes an opening therein through which an electrical terminal of the hot shoe of the flash unit may pass without making electrical contact with said flat portion of said guide means, said contact means comprises a contact washer mounted on said surface of said body means and having an upper surface in contact with the lower surface of said center portion of said bracket means, and includes an electrical lead connected with said contact washer and extending through said body means, said electrically nonconductive means includes a washer formed of electrically insulating material disposed on said shoulder of said body means and having a bottom surface engaging said upper surface of said depressed center portion of said hot shoe means, and said central conductor means terminates in a head portion which forms said electrical contact at the top of said shoulder and which engages the upper surface of said washer of insulation material for maintaining said center portion of said bracket means on said body means.

12. The device of claim 9 wherein
said surface of said body means is in the form of an annular groove and said shoulder extends upwardly from said groove, said center portion of said bracket means is depressed to fit within said groove of said body means, and said contact means comprises a contact washer mounted in the bottom of said groove of said body means and has an upper surface in contact with the lower surface of said depressed center portion of said bracket means thereby forming said slidable rotary electrical contact, and includes an electrical lead connected with said contact washer and extending through said body means.

13. A rotatable hot shoe for photographic apparatus for providing a releasable mechanical and electrical coupling between two photographic devices and for enabling the devices to be rotated with respect to one another while maintaining electrical connection therebetween, comprising body means for supporting said rotatable hot shoe, said body means having a surface with an annular groove therein defining a depression and a central shoulder, said shoulder having an opening therethrough, bracket means rotatably coupled with said body means for mechanically and electrically coupling with a shoe of a first photographic device to be coupled with said hot shoe, said bracket means including first and second spaced guide means having side and upper portions for slidably receiving a cooperating mating shoe of the first photographic device, said guide means including stop means for limiting movement of said cooperating mating shoe, and said bracket means providing a first electrical contact for the shoe of the first photographic device, said bracket means including a central section extending from said guide means and terminating in a depressed center portion having upper and lower surfaces, said center portion having an opening therein, said depressed center portion being mounted in said annular groove of said body means with said opening of said depressed center portion mounted substantially coaxially with respect to said shoulder of said body means, contact means mounted in said body means and engaging a surface of said depressed center portion of said bracket means for providing electrical contact with said depressed center portion irrespective of the degrees of rotation of said bracket means with respect to said body means, electrical nonconductive means between said upper surface of said depressed center portion of said bracket means and said shoulder of said body means for maintaining said center portion of said bracket means in said groove of said body means, and central conductor means extending through said opening in the shoulder of said body means and terminating in an electrical contact at the top of said shoulder of said body means forming a second electrical contact for the shoe of the first photographic device.

14. A rotatable hot shoe as in claim 13 for use with a photographic device having a shoe comprising a mounting flange forming a first electrical conductor and a second electrical conductor disposed centrally with respect to said mounting flange and wherein said guide means of said rotatable hot shoe includes a substantially flat bottom section terminating in a pair of spaced and substantially parallel channel guides, said stop of said guide means includes a tab at one end of said flat portion, and the other end of said flat section includes an opening therein through which said central conductor of said photographic device may pass without making electrical contact with said flat portion of said guide means.

15. A rotatable hot shoe as in claim 14 wherein
said contact means comprises a contact washer mounted in the bottom of said groove of said body means and having an upper surface in contact with the lower surface of said depressed center portion of said rotatable hot shoe, and includes an electrical lead connected with said contact washer and extending through said body means, said electrically nonconductive means includes a washer formed of electrically insulating material disposed on said shoulder of said body means and having a bottom surface engaging said upper surface of said depressed center portion of said rotatable hot shoe and shoe, said central conductor means terminates in a head portion which forms said electrical contact at the top of said shoulder and which engages the upper surface of said washer of insulation material for maintaining said depressed center portion of said rotatable hot shoe within said groove of said body means.

16. A rotatable hot shoe as in claim 13 including
spring means frictionally coupled with said guide means for providing a frictional force fit with the shoe of the first photographic device.

17. A rotatable hot shoe as in claim 13 wherein said body means forms a housing, said housing including therein light sensor means comprising a second photographic device, said light sensor means being mounted in said housing for receiving light directed toward said body means, and said light sensor means including a light sensor and a switching circuit coupled with said light sensor, said switching circuit being electrically connected with said bracket means and said central conductor means for applying an electrical signal to the first photographic device.

18. A rotatable hot shoe for photographic apparatus for providing a releasable mechanical and electrical coupling between two photographic devices and for enabling the devices to be rotated with respect to one another while maintaining electrical connection therebetween, comprising body means for supporting said rotatable hot shoe, said body means having a shoulder with an opening therethrough, bracket means rotatably coupled with said body means for mechanically and electrically coupling with a cooperating mating shoe of a first photographic device to be coupled with said hot shoe, said bracket means including first and second spaced guide means having side and upper portions for slidably receiving, and including stop means for limiting movement of, the mating shoe of the first photographic device, and said bracket means providing a first electrical contact for the shoe of the first photographic device, said bracket means including a central section extending from said guide means and terminating in a center portion having upper and lower surfaces, said center portion having an opening therein, said center portion being mounted on said body means with said opening of said center portion mounted substantially coaxially with respect to said shoulder of said body means, contact means mounted on said body means and engaging a surface of said center portion of said bracket means for providing electrical contact with said center portion irrespective of the degrees of rotation of said bracket means with respect to said body means, electrically nonconductive means between said upper surface of said center portion of said bracket means and said shoulder of said body means for maintaining said center portion of said bracket means on said body means, and central conductor means extending through said opening in the shoulder of said body means and terminating in an electrical contact at the top of said shoulder of said body means and forming a second electrical contact for the shoe of the first photographic device.

19. A rotatable hot shoe as in claim 18 wherein said contact means comprises a contact washer mounted on said body means and having an upper surface in contact with the lower surface of said center portion of said rotatable hot shoe, and includes an electrical lead connected with said contact washer and extending through said body means, said electrically nonconductive means includes a washer formed of electrically insulating material disposed on said shoulder of said body means and having a bottom surface engaging said upper surface of said center portion of said rotatable hot shoe, and said central conductor means terminates in a head portion which forms said electrical contact at the top of said shoulder and which engages the upper surface of said washer of insulation material for maintaining said center portion of said rotatable hot shoe on said body means.

20. A rotatable hot shoe as in claim 18 wherein said body means forms a housing, said housing including therein light sensor means comprising a second photographic device, said light sensor means being mounted in said housing for receiving light directed toward said body means, and said light sensor means including a light sensor and a switching circuit coupled with said light sensor, said switching circuit being electrically connected with said bracket means and said central conductor means for applying an electrical signal to the first photographic device.

* * * * *